United States Patent
Schauerte et al.

(10) Patent No.: US 9,914,490 B2
(45) Date of Patent: Mar. 13, 2018

(54) FRAME STRUCTURE WITH AT LEAST ONE CONSOLE FOR CONNECTING FURTHER COMPONENTS, METHOD FOR PRODUCING AND MOTOR VEHICLE BODY

(71) Applicant: AUDI AG, Ingolstadt (DE)

(72) Inventors: Oliver Schauerte, Bad Wimpfen (DE); Florian Eidmann, Öhringen (DE); Karl Durst, Bergen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/330,820

(22) Filed: Nov. 7, 2016

(65) Prior Publication Data
US 2017/0129545 A1  May 11, 2017

(30) Foreign Application Priority Data
Nov. 6, 2015 (DE) .......................... 10 2015 014 365

(51) Int. Cl.
| | |
|---|---|
| B62D 27/02 | (2006.01) |
| B62D 21/02 | (2006.01) |
| B62D 29/00 | (2006.01) |
| B62D 29/04 | (2006.01) |

(52) U.S. Cl.
CPC ........... *B62D 27/023* (2013.01); *B62D 21/02* (2013.01); *B62D 29/002* (2013.01); *B62D 29/041* (2013.01); *B60Y 2410/122* (2013.01)

(58) Field of Classification Search
CPC .... B62D 27/023; B62D 21/02; B62D 29/041; B62D 29/002; B60Y 2410/122
USPC ..................................... 296/187.01, 29, 205
See application file for complete search history.

(56) References Cited

U.S. PATENT DOCUMENTS

| | | | | |
|---|---|---|---|---|
| 6,273,495 B1* | 8/2001 | Haba | .................... | B60H 1/0055 180/90 |
| 8,474,902 B2* | 7/2013 | Malek | .................. | B62D 25/145 296/193.02 |
| 8,894,128 B2* | 11/2014 | Barral | ..................... | B60J 5/107 296/146.6 |
| 2003/0152745 A1* | 8/2003 | Wagenblast | ...... | B29C 45/14467 428/119 |
| 2010/0072784 A1* | 3/2010 | Malek | .................. | B62D 25/145 296/193.01 |

(Continued)

FOREIGN PATENT DOCUMENTS

| | | |
|---|---|---|
| DE | 44 23 642 | 10/1995 |
| DE | 102 56 608 | 7/2004 |
| DE | 10 2005 061 474 | 7/2007 |

(Continued)

OTHER PUBLICATIONS

European Search Report dated Mar. 9, 2017 with respect to counterpart European patent application EP 16 00 2246.

(Continued)

*Primary Examiner* — Jason S Morrow
*Assistant Examiner* — E Turner Hicks
(74) *Attorney, Agent, or Firm* — Henry M. Feiereisen LLC

(57) ABSTRACT

A frame structure for a motor vehicle body includes at least two profile components and a connecting node, which connects the profile components with each other. At least one of the profile components has at least one console which is made of fiber reinforced plastic and on which other components can be fastened or supported.

11 Claims, 2 Drawing Sheets

(56) References Cited

U.S. PATENT DOCUMENTS

2011/0194896 A1* 8/2011 Fenger ............... F03D 1/005
  403/373
2012/0175858 A1* 7/2012 Hendriks ............. B60G 7/02
  280/124.161

FOREIGN PATENT DOCUMENTS

| DE | 10 2007 027 593 | 12/2008 |
| DE | 10 2011 107 212 | 1/2013 |
| DE | 10 2012 112 313 | 6/2014 |
| DE | 10 2013 226 607 | 6/2015 |
| DE | 10 2014 209 991 | 12/2015 |
| DE | 10 2013 220 209 | 4/2016 |
| WO | WO 02/02292 | 1/2002 |
| WO | WO 2012/062391 | 5/2012 |

OTHER PUBLICATIONS

Translation of European Search Report dated Mar. 9, 2017 with respect to counterpart European patent application EP 16 00 2246.

* cited by examiner

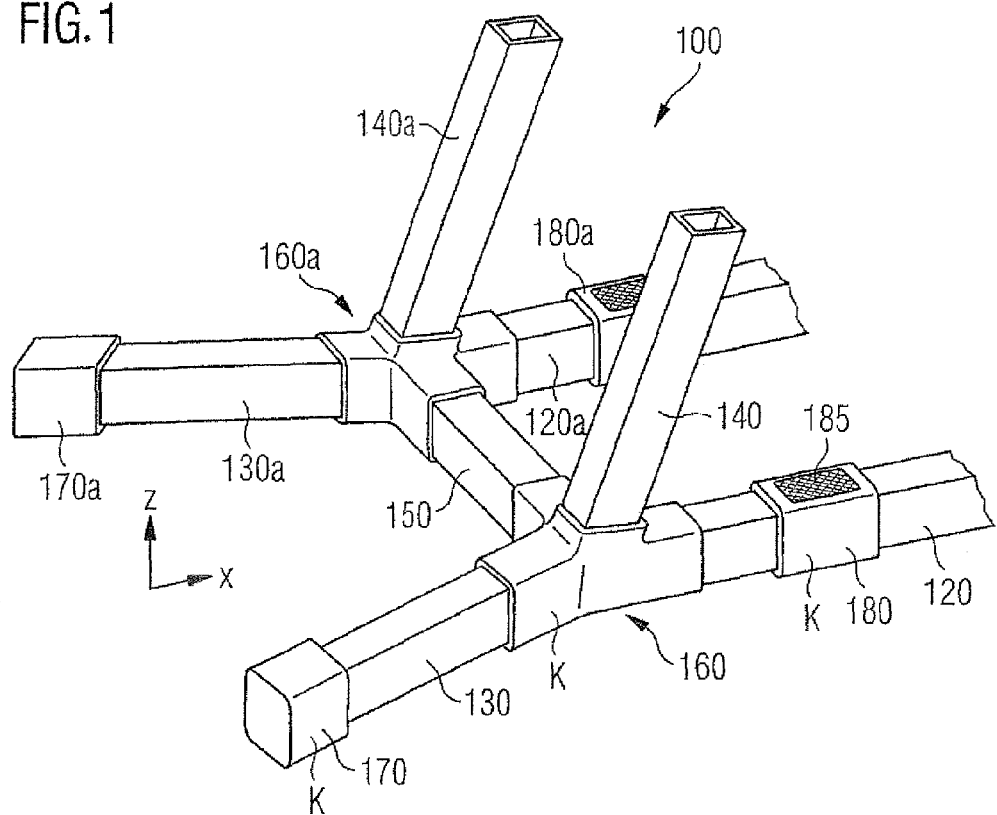
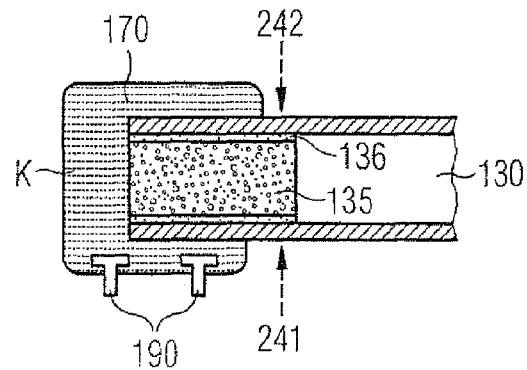

FIG.3
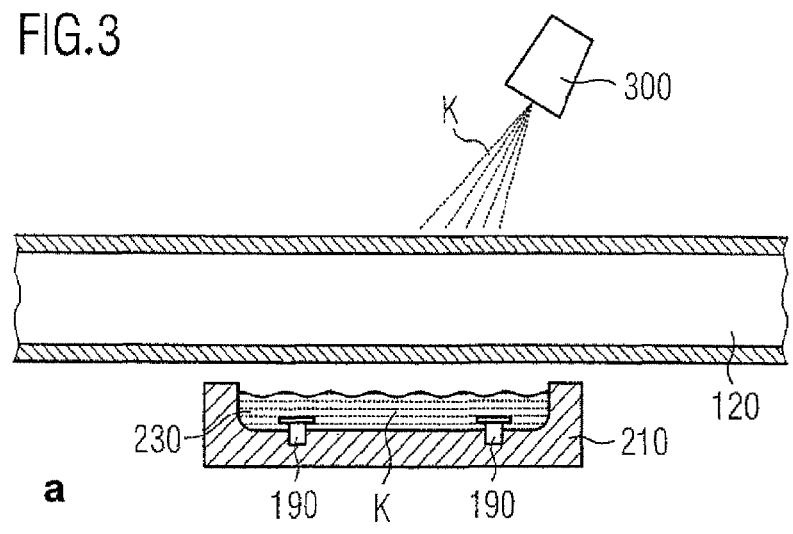
a
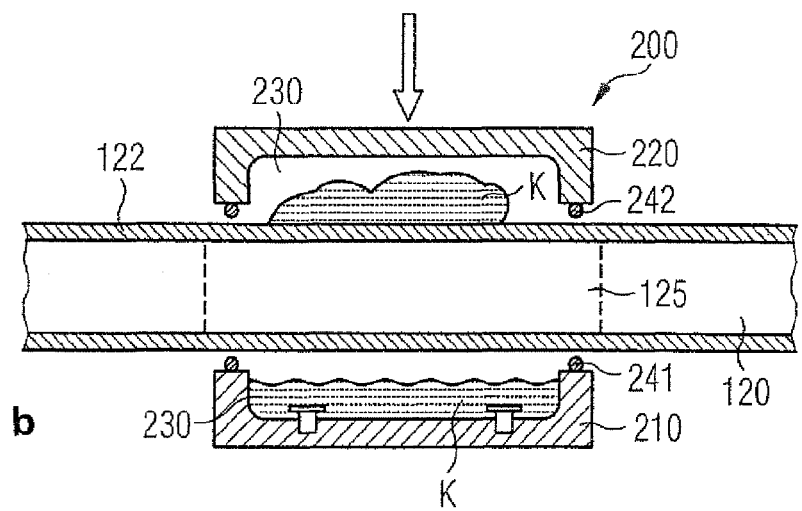
b
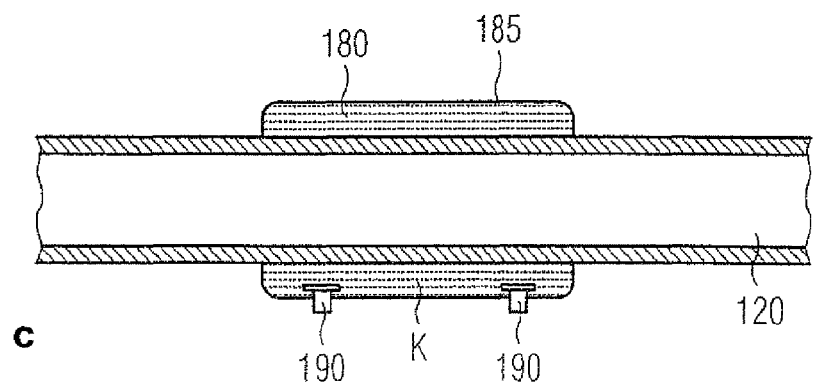
c

FRAME STRUCTURE WITH AT LEAST ONE CONSOLE FOR CONNECTING FURTHER COMPONENTS, METHOD FOR PRODUCING AND MOTOR VEHICLE BODY

CROSS-REFERENCES TO RELATED APPLICATIONS

This application claims the priority of German Patent Application, Serial No. 10 2015 014 365.4, filed Nov. 6, 2015, pursuant to 35 U.S.C. 119(a)-(d), the content of which is incorporated herein by reference in its entirety as if fully set forth herein.

BACKGROUND OF THE INVENTION

The invention relates to a frame structure for a motor vehicle body with at least two profile components and a connecting node, which connects the profile components with each other.

It would be desirable and advantageous to provide to provide options how to improve the connection of such a frame structure to further components.

SUMMARY OF THE INVENTION

According to one aspect of the present invention a frame structure for a motor vehicle body, said frame structure includes: at least two profile components; and a connecting node which connects the at least two profile components with each other, wherein at least one of the at least two profile components has at least one console made of fiber reinforced plastic, wherein the at least one console is adapted for fastening or supporting other components thereon.

The term console involves a support element which is configured in the manner of a protrusion and which is form fittingly and/or materially bondingly fastened on the respective profile part, on which support element other components (attachments) can be fastened or supported. For this purpose, the console is preferably provided with at least one molded-on connecting section, in particular in the form of a connecting surface or screw-on-surface. The console can further also have at least one load introduction element for example a metallic insert which is anchored in the fiber reinforced plastic material and can serve as force introduction point and in particular as screw-on-point.

The term profile part means in particular a longitudinal rod-like component with a defined cross sectional shape (profile), which can have a straight or curved or bent axial extent. The cross sectional shape or the profile can change over the axial extent. Preferably the respective profile part is a hollow section. The term hollow section means a tubular profile part with a closed cross section (hollow section) and with at least one profile chamber. Preferably all profile parts of the frame structure according to the invention are hollow sections.

Preferably at least the respective profile part or hollow profile part is made of a fiber composite plastic (FKV) or a fiber plastic composite material. The term fiber plastic composite material means a consolidated and cured plastic composite material made of a synthetic matrix and reinforcement fibers. The synthetic material (matrix) can be a thermoset or thermoplastic. The reinforcement fibers can be for example carbon, glass, synthetic or mixed fibers. Preferably they are so-called endless fibers. The profiles can for example be produced by pultrusion or extrusion. The profiles can also be braided or coiled.

The console is made of a fiber reinforced plastic. The fiber reinforced plastic material can for example be molded to or pressed onto the respective profile component, as explained in more detail below. The plastic material (matrix) can be a thermoset or thermoplastic. The reinforcement fibers can or example be carbon, glass, synthetic or mixed fibers. Preferably they are short fibers which have a length of 1 mm to 100 mm, preferably 2 mm to 50 mm and in particular 3 mm to 25 mm. particularly preferably they are recycled fibers.

Preferably the console is configured to completely embrace the profile component at the corresponding site, i.e., the console is (when viewed in circumferential direction) configured in the manner of a sleeve or pipe bracket about the profile component.

The console can be arranged on a free end of the profile component, i.e., not on an end that is connected in a connecting node. Preferably the console forms hereby at the same time also a profile section.

According to another aspect of the invention a method for producing a console on a profile component for a frame structure includes the steps of: positioning the profile component in a pressing tool that produces the console; performing a pressing procedure in the presence of a fiber containing plastic mass in the pressing tool for generating the console; and opening the pressing tool (after curing of the plastic mass) and removing the profile component with the console formed thereon.

The pressing tool is in particular a multi-part pressing tool with a shape-defining tool cavity. The fiber containing plastic mass can be introduced prior to closing the pressing tool or also after closing the pressing tool (transfer molding) into the tool cavity. The fiber containing plastic mass can for example be SMC-mass (sheet Molding Compound) or BMC mass (Bulk Molding Compound).

According to another advantageous feature of the invention, the profile component is a hollow profile component and the console is formed on a free end or profile end of the profile component, wherein the open profile end is first closed by a closing element which then during the pressing process prevents the fiber containing plastic mass from entering the hollow profile part.

The closing element is in particular made of a plastic foam material or synthetic foam and closes the open profile end in the manner of a plug or stopper. The plastic foam material is in particular a heat resistant and pressure resistant, preferably closed-cell, hard foam or hard foam material, for example on PMI basis (polymethacrylimide) or PU-basis (polyurethane). The closing element, which is made of plastic foam material, can for example be produced from a pre-manufactured foam material (in particular a semi-finished foam product such as a hard foam plate or the like) and can be glued into the open profile end. Another possibility is to foam out the open profile end and thereby close this end in the manner of a plug or stopper. The closure depth of the stopper or plug-like closing element (this refers to the insertion depth, gluing-in depth or foaming-in depth) can be 10 mm to 100 mm, preferably 20 mm to 80 mm, particularly preferably 40 mm to 60 mm and in particular about 50 mm.

According to another aspect of the invention, a motor vehicle, includes a frame structure, wherein the frame structure includes at least two profile components and a connecting node which connects the at least two profile components with each other, wherein at least one of the at least two profile components has at least one console made of a fiber reinforced plastic, and wherein the at least one console is adapted for fastening or supporting other components thereon.

The frame structure can be made with the method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which FIG. 1 shows a perspective view of a frame structure of a vehicle body made of hollow profile components.

FIG. 2 shows a section through a profile end part on the frame structure of FIG. 1.

FIG. 3 illustrates in sectional view the production of a console on the frame structure of FIG. 1.

DETAILED DESCRIPTION OF PREFERRED EMBODIMENTS

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a rear frame structure or vehicle rear section structure 100, which is a part of a greater frame structure (Space-Frame) of a passenger car vehicle body. The frame structure 100 includes multiple separately pre-manufactured hollow profile components 120, 120a, 130, 130a, 140, 140a and 150, which are made of fiber plastic composite material and which are fixedly connected with each other via connection nodes 160 and 160a. A connecting node 160 or 160a is thus a connecting element which connects multiple profile components with each other at their node-side profile ends. The connecting nodes 160 and 160a are made of fiber reinforced plastic K. The frame profile parts 130 and 130a that function as longitudinal member are in addition provided with profile end parts 170 and 170a at their free profile ends that face away from the connecting nodes 160 and 160a. The profile end parts 170 and 180a are also made of fiber reinforced plastic K.

The hollow profile components 120, 120a, 130, 130a, 140, 140a and 150, are for example produced by means of pultrusion (fiber plastic composite-pultrusion profiles), braiding or coiling. The hollow profile parts 120, 120a, 130, 130a, 140, 140a and 150, can be configured differently depending on the loads and can therefore have different cross sections and/or wall thicknesses and/or be made of different fiber plastic composite materials. The hollow profile components 120, 120a, 130, 130a, 140, 140a and 150, can also have varying cross sections over their longitudinal extent.

The frame structure 100 can further have open profile components (for example U-profiles) and/or full profile components, and also profile components that are made of other materials (for example also metal), wherein such profile components can also be integrated in the frame structure 100 via the connecting nodes 160 or 160a. In spite of its low weight the frame structure 100 has excellent strength, stiffness and crash stability.

The frame profile parts 120 and 120a, which also function as a longitudinal member, are configured with sleeve-like consoles 180 and 180a, which for example serve as motor bearing and/or for fastening chassis components. The consoles 180 and 180a are also made of a fiber reinforced plastic K. Reference numeral 185 designates a flat connecting section on the consoles 180 or 180a, which for example serves for connecting or supporting a motor bearing or the like.

In the following the production or manufacturing of such a console 180 is explained with reference to FIG. 3. For producing the console 180 the hollow profile component 120 is inserted with its corresponding section into a pressing tool 200 that produces the console 180, as shown in FIG. 3a. The multi-part pressing tool 200 is configured so as to enable a positionally accurate fixing of the hollow profile component 120.

In the tool cavity 230 of the lower tool 210 a short fiber or short fiber containing plastic mass K, in particular with thermoset matrix (resin), is present that was introduced already prior to positioning the hollow profile component 120. After the position of the hollow profile component 120 a further short fiber containing plastic mass K is applied to the hollow profile component 120 at the corresponding site or is molded on with the shown spray device 300.

Subsequently the pressing tool 200 is closed by lowering the upper tool 220 as shown in FIG. 3 and a pressing process is performed. During this pressing process the defined mass of the short fiber containing plastic mass K is distributed in the cavity 230 abut the hollow profile component 120, i.e., the hollow profile component 120 is surrounded by the short fiber containing plastic mass K at the corresponding site, wherein as the case may be also a materially bonding connection between the short fiber containing plastic mass K and the hollow profile component 120 can form. During the pressing process the sealing of the tool cavity 230 is brought about by means of sealings 241 and 242.

The fiber containing plastic mass K can for example be SMC or BMC mass. An alternative method variant provides that the fiber containing plastic mass K is only injected into the cavity 230 during the pressing process or shortly before the pressing process which is also referred to as transfer molding, similar to the RTM method.

In order for the hollow profile walling 122 of the hollow profile component 120 having a sufficient stability during the pressing process it is provided that this walling has a wall thickness or wall strength of 0.6 mm to 10 mm, preferably 2 mm to 8 mm and in particular 3 mm to 7 mm. Furthermore, analogous to the illustration in FIG. 2 (see below), an inner support 125 can be provide by means of a foam material or the like introduced into the profile chamber. The latter is for example also advantageous with regard to the crash stability.

After the plastic mass K is cured under influence of pressure and temperature (hot pressing) the pressing tool 200 can be opened and the hollow profile component 120 can be removed with the console 180 formed thereon as shown in FIG. 3c.

During production of the console 180 metallic inserts 190 are simultaneously embedded in the plastic material K at the bottom side of the console, which metallic inserts later also serve for example as screw-on points for chassis components.

The console 180 which serves for fastening or support of further components is formed in one piece with the hollow profile component 120 and made of a fiber reinforced plastic material K. a significant advantage of the invention is that the structure of the hollow profile component 120 is not adversely affected. In particular no disadvantageous damage to the obtained reinforcement fibers occurs (typically long fibers or endless fibers). The sleeve like console 180 can also cause a local reinforcement of the hollow profile component 120. A further advantage is that the console 180, including at least one connecting section 185, can be produced with end geometry and thus does not require post processing.

The production of a profile end piece 170, which also serves as console, is performed analogous to the approach illustrated in FIG. 3. However the open profile end is first closed by a stopper or plug-like closing element 135 as shown in FIG. 2. The closing element 135 is made of a plastic foam material, in particular of a temperature and pressure resistant hard foam and is for example glued in. the adhesive is designated 136. During the pressing procedure the closing element 135 acts as a barrier and prevents the fiber containing plastic mass K from entering into the interior or the profile chambers of the hollow profile component 130. The axial length or closure depth of the closing element 135 is preferably dimensioned so that the closing element reaches at least into a tool sealing region of the pressing tool 200 which sealing region is formed by the tool sealings 241 and 242, so that the closing element 135 during the pressing process can cause a stabilization of the hollow profile walling and improve the cavity sealing.

The console 180 and/or the end piece 170 can be produced prior to the connection of the corresponding profile component 120 or 130 with the other profile components or subsequent thereto, i.e., after the formation of the connecting node 160. With the described approach a console 180 or an end piece 170 can also subsequently be produced.

What is claimed as new and desired to be protected by Letters Patent is set forth in the appended claims and includes equivalents of the elements recited therein:

1. A frame structure for a motor vehicle body, said frame structure comprising:
   at least two profile components; and
   a connecting node which connects the at least two profile components with each other, and at least one of the at least two profile components has at least one console made of fiber reinforced thermoset plastic, said at least one console having a metallic insert configured as a force application point anchored in the fiber reinforced thermoset plastic of the console, said at least one console being adapted for fastening or supporting other components thereon.

2. The frame structure of claim 1, wherein the console has at least one of a connecting section and an integrated load introduction element.

3. The frame structure of claim 1, wherein the console is made of a plastic that is reinforced with short fibers.

4. The frame structure of claim 1, wherein the console is formed about the profile component in the manner of a sleeve.

5. The frame structure of claim 1, wherein the console is arranged on a free end of the one of the at least two profile components and forms an end piece of the one of the at least two profile components.

6. The frame structure of claim 1, wherein the at least two profile components are made of a fiber reinforced plastic composite material.

7. A method for producing a console on a profile component for a frame structure, said method comprising the steps of:
   positioning the profile component in a pressing tool that produces the console;
   performing a pressing procedure in the presence of a fiber containing thermoset plastic mass in the pressing tool for generating the console;
   opening the pressing tool and removing the profile component with the console formed thereon; and
   anchoring a metallic insert configured as a force application point in the fiber reinforced thermoset plastic of the console.

8. The method of claim 7, wherein the fiber-containing plastic mass is SMC or BMC.

9. The method of claim 7, wherein the profile component is a hollow profile component and the console is molded onto a free end of the hollow profile component, the method further comprising closing an open profile end of the hollow profile component with a closing element which during the pressing procedure prevents entering of the fiber-containing plastic mass into the hollow profile component.

10. A motor vehicle, comprising:
    a frame structure, said frame structure comprising at least two profile components and a connecting node which connects the at least two profile components with each other, and at feast one of the at least two profile components has at least one console made of fiber reinforced thermoset plastic, said at least one console having a metallic insert configured as a force application point anchored in the fiber reinforced thermoset plastic of the console, said at least one console being adapted for fastening or supporting other components thereon.

11. The motor vehicle of claim 10, wherein the frame structure is produced with the following method steps:
    positioning the profile component in a pressing tool;
    performing a pressing procedure in the presence of a fiber containing plastic mass in the pressing tool for generating the console; and
    opening the pressing tool and removing the profile component with the console formed thereon.

* * * * *